US008099956B2

(12) United States Patent
Wegner

(10) Patent No.: US 8,099,956 B2
(45) Date of Patent: Jan. 24, 2012

(54) ARRANGEMENT OF SUPERCHARGING UNITS FOR SUPERCHARGING AN INTERNAL COMBUSTION ENGINE

(75) Inventor: Jürgen Wegner, Eislingen/Fils (DE)

(73) Assignee: Behr GmbH & Co. KG, Stuttgart (DE)

( * ) Notice: Subject to any disclaimer, the term of this patent is extended or adjusted under 35 U.S.C. 154(b) by 816 days.

(21) Appl. No.: 12/127,953

(22) Filed: May 28, 2008

(65) Prior Publication Data
US 2008/0295515 A1 Dec. 4, 2008

(30) Foreign Application Priority Data
May 29, 2007 (DE) .......................... 10 2007 025 173

(51) Int. Cl.
*F02B 33/44* (2006.01)
*F02B 29/04* (2006.01)
*F02B 33/00* (2006.01)
*F02M 25/07* (2006.01)

(52) U.S. Cl. ............ 60/612; 60/605.2; 60/599; 123/563; 123/568.12

(58) Field of Classification Search ............... 123/559.1, 123/563, 568.12; 60/612, 605.2, 599; *F02B 29/04; F02M 25/07; F01P 3/20*
See application file for complete search history.

(56) References Cited

U.S. PATENT DOCUMENTS

| 2,361,726 | A | * | 10/1944 | Weimar ........................... 415/87 |
| 2,612,310 | A | * | 9/1952 | Eggmann ....................... 415/179 |
| 4,125,345 | A | * | 11/1978 | Yoshinaga et al. ............. 417/243 |
| 4,196,593 | A | * | 4/1980 | Froeliger ........................ 60/612 |
| 4,400,945 | A | | 8/1983 | Deutschmann et al. ......... 60/612 |
| 6,029,637 | A | * | 2/2000 | Prior .............................. 123/563 |
| 6,837,195 | B2 | * | 1/2005 | Suwazono ................. 123/559.1 |
| 7,011,079 | B2 | * | 3/2006 | Park .............................. 123/563 |
| 7,278,472 | B2 | * | 10/2007 | Meshenky et al. ............ 123/563 |

(Continued)

FOREIGN PATENT DOCUMENTS
DE 30 05 655 A1 8/1981
(Continued)

OTHER PUBLICATIONS
A fully Certified English Translation of DE 19853455 B4, published on Jun. 2, 1999.*

(Continued)

*Primary Examiner* — Thai Ba Trieu
(74) *Attorney, Agent, or Firm* — Foley & Lardner LLP

(57) ABSTRACT

The invention is based on an arrangement of supercharging units (1, 5, 6, 7), which arrangement is to be attached in the construction space of a motor vehicle, for supercharging an internal combustion engine with a fluid (23) comprising charge air and/or exhaust gas, wherein the supercharging units (1, 5, 6, 7) comprise at least one heat exchanger (5, 6, 7) and at least one compressor (1). According to the concept of the invention, the supercharging units (1, 5, 6, 7) are arranged combined in a module (10A, 10B) and, in order for the same to be kept together in the module (10A, 10B), the supercharging units (1, 5, 6, 7) are connected at any rate partially to one another in a fluid-conducting manner, and at least one of the supercharging units (1, 5, 6, 7) is held on a holding structure. This enables the supercharging units to be handled flexibly, simply and nevertheless in a manner saving on construction space and outlay on connection. The invention also leads to a production method.

18 Claims, 8 Drawing Sheets

U.S. PATENT DOCUMENTS

| | | | |
|---|---|---|---|
| 2002/0056444 A1 | 5/2002 | Chou et al. | 123/563 |
| 2004/0118389 A1 | 6/2004 | Shaffer et al. | 123/563 |
| 2009/0071450 A1 | 3/2009 | Doring et al. | 123/563 |

FOREIGN PATENT DOCUMENTS

| | | | |
|---|---|---|---|
| DE | 3921566 A1 * | 1/1991 | |
| DE | 198 53 455 B4 | 6/1999 | |
| DE | 101 18 951 A1 | 10/2002 | |
| DE | 101 18 951 C2 | 10/2002 | |
| DE | 102 30 934 A1 | 1/2004 | |
| DE | 10 2005 025 602 A1 | 12/2006 | |
| EP | 1 433 936 A1 | 6/2004 | |
| EP | 1 643 097 B1 | 4/2006 | |
| FR | 2 890 698 A1 | 3/2007 | |
| GB | 1603575 A * | 11/1981 | |
| JP | 60212617 A * | 10/1985 | |
| JP | 03134229 A * | 6/1991 | 123/563 |
| WO | WO 2006/111307 A1 | 10/2006 | |
| WO | WO 2007/031635 A1 | 3/2007 | |

OTHER PUBLICATIONS

A Machine Translation of DE 102005025602 A1, published on Dec. 7, 2006.*

A fully Certified English Translation of DE 10118951 A1, published on Oct. 31, 2002.*

A Machine Translation of WO 2007031635 A1, published on Mar. 22, 2007.*

* cited by examiner

ARRANGEMENT OF SUPERCHARGING UNITS FOR SUPERCHARGING AN INTERNAL COMBUSTION ENGINE

CROSS-REFERENCE TO RELATED PATENT APPLICATIONS

The right of foreign priority is claimed under 35 U.S.C. §119(a) based on Federal Republic of Germany Application No. 10 2007 025 173.6, filed May 29, 2007, the entire contents of which, including the specification, drawings, claims and abstract, are incorporated herein by reference.

BACKGROUND OF THE INVENTION

The invention relates to an arrangement of supercharging units for supercharging an internal combustion engine with a fluid comprising charge air and/or exhaust gas, wherein the supercharging units comprise at least one heat exchanger and at least one compressor.

To an increasing extent, modular solutions which save on construction space and keep the outlay on connection low are realized within the context of exhaust gas recirculation or charge air supply. The positionings of individual components of an exhaust gas recirculation system or of a charge air supply system, which positionings have hitherto been sometimes independent, generally also require an increased outlay on assembly during the completion of the engine. Sometimes, the independent positions are comparatively far apart, and therefore this may incur disadvantages with regard to operational or production costs. For example, individual supercharging units of the type mentioned at the beginning are distributed comparatively far apart from one another over the engine compartment in the vicinity of an internal combustion engine and are connected to one another in a fluid-conducting manner, for example via pipe or hose connections. For the assembly, the supercharging units are generally fitted individually in the construction space-coordination of the overall arrangement of the supercharging units with regard to flow or conduit optimization, and thermodynamic and constructional coordination being possible only to a limited extent. Different manufacturers generally make a delivery to the final assembly site-necessitating a quality check, in particular with regard to the connection technology, at the final assembly site.

A known approach for reducing problems of this type is known from EP 1 643 097 A1 which discloses a multifunctional module which integrates the functions of exhaust gas cooling and regulation of the exhaust gas cooling and to which a heat exchanger can be attached.

Such a module generally has to be designed with regard to a comparatively specific construction space situation. A solution which solves the above-mentioned problems within the context of a more flexible approach would be desirable.

SUMMARY OF PREFERRED EMBODIMENTS

This is the starting point of the invention, the object of which is to provide a device enabling the supercharging of an internal combustion engine with a fluid comprising charge air and/or exhaust gas to be handled in a manner which saves on construction space and is provided with a comparatively reduced outlay on connection but nevertheless is flexible. It is also the object of the invention to provide an exhaust gas recirculation and/or charge air supply system suitable for this for an internal combustion engine and to provide a corresponding internal combustion engine. It is furthermore the object of the invention to provide a method for producing an exhaust gas recirculation system and/or a charge air supply system, which method saves on construction space, is comparatively simplified, in particular with regard to the outlay on connection and outlay on assembly, and is nevertheless reliable.

With regard to the device, the object is achieved by the invention with an arrangement of supercharging units of the type mentioned at the beginning, in which, according to the invention, the supercharging units are arranged combined in a module and, in order for the same to be kept together in the module, the supercharging units are connected at any rate partially to one another in a fluid-conducting manner, and at least one of the supercharging units is held on a holding structure.

The invention has recognized that the arrangement of the supercharging units combined in a module is possible in advance of a final assembly, for example at a supplier, according to the concept of the invention, and, as a result, not only can the outlay on assembly as such in advance of the final assembly be reduced, but, furthermore, an overall logistical outlay for the otherwise necessary assembly of a multiplicity of supercharging units, further individual components and associated fastening and holder elements can be reduced too. This situation has proven particularly critical in the assembly of supercharging units and/or individual components on the internal combustion engine.

The arrangement of the supercharging units combined in a module, according to the concept of the invention, firstly permits a flexible combination of known supercharging units or slightly modified supercharging units lying within the context of previous development concepts. In other words, the supercharging units may be provided separately and essentially unchanged within the scope of existing supplier concepts and nevertheless may be combined in the module. A specially designed and therefore comparatively inflexible integration in an integral closed construction unit is not required.

Secondly, there is nevertheless also a considerable simplification of the thermodynamic and structural coordination of the supercharging units and components with one another, in particular at an early point when the supplier has them. The invention has recognized that, in particular in the sphere of the functionality of a charge air supply and/or exhaust gas recirculation, an adequate structural and thermodynamic design with regard to an internal combustion engine can take place, in particular even before the beginning of final assembly. This additionally has the advantage that a structural design of the arrangement of supercharging units for a comparatively small construction space, for example by means of an improved arrangement or shortening of fluid-conducting connections, is possible. In addition, a synergetic further structural and thermodynamic design of the overall arrangement with regard to the overall functionality of a charge air supply and/or an exhaust gas recirculation can already take place before final assembly such that the supercharging units are held together in the module. To this end, the concept of the invention likewise makes provision for the supercharging units to be connected at any rate partially to one another in a fluid-conducting manner, and for at least one of the supercharging units to be held on a holding structure.

Accordingly, the concept of the invention leads to a use of the arrangement of the type explained above for attaching, preferably directly, to the internal combustion engine, in particular on a single side of the internal combustion engine. An attachment of a plurality of modules can preferably be provided, for example a module exclusively for charge air supply on a first side of the internal combustion engine, and a further module exclusively for the exhaust gas recirculation on a further side of the internal combustion engine.

The invention also leads to a corresponding exhaust gas recirculation system for an internal combustion engine, having exhaust gas recirculation, a compressor and an arrangement according to the concept of the invention.

The invention also leads to a charge air supply system for an internal combustion engine, having a charge air intake, an air filter, a compressor and an arrangement according to the concept of the invention.

The concept of the invention accordingly leads to an internal combustion engine with the arrangement according to the invention and/or with a system according to the invention.

With regard to the method, the object is achieved by the invention with a production method of the type mentioned at the beginning, which, according to the invention, has the following steps: providing an arrangement of supercharging units for supercharging an internal combustion engine with a fluid comprising charge air and/or exhaust gas, wherein the supercharging units comprise at least one heat exchanger and at least one compressor; arranging the supercharging units combined in a module, with the same being held together in the module by the supercharging units being connected at any rate partially to one another in a fluid-conducting manner, and at least one of the supercharging units being attached to a holding structure.

The production method according to the concept of the invention permits the supercharging units and further individual components and connecting parts to be combined with comparatively little outlay and enables optimization of a structural and thermodynamic design. For example, optimization of the construction space requirement, of a connecting length of the in particular fluid-conducting parts or of the preferred arrangement of the module on a preferred side of the engine is possible, if appropriate with the functionality of the supercharging units combined in the module being taken into consideration. A plurality of modules for arrangement on different sides of the engine can also be provided. This type of optimization options results overall in a considerable potential for improvement for energy consumption of the engine, in particular for consumption on the surface of the engine.

The concept according to the invention of the production method makes it possible in particular for the method steps to already be carried out at the supplier or at a preassembly site at the car manufacturer. The production of the module by the supercharging units as such being arranged in a combined manner and connected in a fluid-conducting manner and such that they are held—which is suitable for transportation—is considerably simpler, since the accessibility of the module as such is simpler than the accessibility of individual supercharging units in the engine compartment.

Advantageous developments of the invention can be gathered from the subclaims and in particular provide advantageous possibilities for realizing the above-explained concept within the scope of the objective, and with regard to further advantages.

Within the scope of the concept of the invention, one heat exchanger and one compressor may be arranged combined in the module. In the scope of a modification, likewise following the concept of the invention, a number of heat exchangers, for example two charge air coolers and an exhaust gas cooler, and, if appropriate, a number of compressors, for example high-pressure and low-pressure turbines, as the most important supercharging units can preferably be arranged combined in the module. According to a particularly preferred development of the invention, at least one heat exchanger with at least one compressor is connected in a fluid-conducting manner in the module. All of the supercharging units are preferably connected to one another in a fluid-conducting manner.

In particular, the supercharging units can be arranged in such a manner that, in the fitted position, they are part of a charge air supply system or of an exhaust gas recirculation system—they can also be arranged in such a manner that, in the fitted position, they are part of a charge air supply system and exhaust gas recirculation system. For example, it is possible to provide an arrangement in which at least one heat exchanger is formed as a charge air heat exchanger, in particular an intermediate cooler and a high-pressure cooler. One heat exchanger can preferably also be formed as an exhaust gas heat exchanger, in particular exhaust gas cooler. Within the context of a particularly preferred development, a first and second heat exchanger can be provided, with the first heat exchanger being formed as a charge air heat exchanger and the second heat exchanger being formed as an exhaust gas heat exchanger. Correspondingly, a compressor can also be assigned to a charge air supply system and/or to an exhaust gas recirculation system, i.e., if appropriate, also in combination both as part of a charge air supply system and exhaust gas recirculation system.

Other developments of the invention than the ones mentioned here can be flexibly provided, depending on requirements, within the scope of the concept if the intended use makes this necessary; as explained above, the concept of the invention has proven particularly flexible with regard to the combining of the supercharging units in a module. Within the scope of a very particularly preferred development of the invention, two charge air heat exchangers, an exhaust gas heat exchanger and an exhaust gas turbocharger, in particular a high-pressure and low-pressure turbocharger, with corresponding air compressors as supercharging units, are arranged combined in the module, with the exhaust gas heat exchanger and the exhaust gas turbocharger being connected to each other in a fluid-conducting manner. Cooling means, such as, for example, cooling lines and/or a cooling plate, are preferably also arranged in the module.

The arrangement can preferably be attached directly to the internal combustion engine. In particular for this purpose, at least one of the supercharging units, in particular at least one heat exchanger, has a fluid-conducting connection to the internal combustion engine. In a similarly advantageous manner, at least one of the supercharging units has a fastening connection for fastening the module to the internal combustion engine. According to this or the previously mentioned development of the invention, the arrangement can be fastened directly to an internal combustion engine and connected in a fluid-conducting manner with particularly little outlay.

According to a particularly preferred development of the invention, at least one of the supercharging units is held on the holding structure so as to define the position of the supercharging unit in the module and/or in the fitted position. It has been shown that the arrangement can have supercharging units connected at any rate partially to one another, in particular, according to the concept of the invention, likewise connected partially to one another in a fluid-conducting manner. Such connections do not always guarantee a structural integrity necessary, for example, for transporting the module, but said integrity can be produced by means of the holding structure, in particular the frame. Furthermore, it may be advantageous for the arrangement also to arrange supercharging units combined in the module, which supercharging units are not connected to other supercharging units of the module. In particular, supercharging units of the abovementioned type can be defined in their position relative to the further supercharging units in the module with the use of the holding structure according to the abovementioned development. The module can be safely handled without one of the supercharging units being displaced in its position. On the contrary, it is ensured that all of the supercharging units of the module are held in such a manner that they are located in the fitted position when the module is inserted into the engine compartment. In addition or as an alternative to a structural part in the form of a frame, a holding structure can have one or more structural parts selected from the group comprising: a strut, a support, a holder, a clip, a flange or another fastening part.

Particularly preferred developments of the production method according to the invention can be gathered from the further subclaims and in particular provide advantageous options for realizing the above-explained method concept within the context of the objective, and with regard to further advantages.

An above-explained holding structure for defining the position of the supercharging unit in the module and/or in the fitted position is preferably attached to the corresponding supercharging units of the module. For this purpose, the holding structure, in particular a frame, has corresponding struts or clips or clamps or other receptacles to which a corresponding structural feature of a supercharging unit, for example a connecting branch, a strut, a rod of the supercharging unit or the like, is assigned. A supercharging unit can be held directly or indirectly on the holding structure.

The arrangement according to the concept of the invention can be transported, in a further method step, from a preassembly site to a final assembly site with the holding structure—preferably and, if appropriate, by means of the frame or by means of supporting or lifting aids attached to the frame. The final assembly site is preferably at a car manufacturer. A preassembly site can be arranged at a supplier or at the car manufacturer, separately from the final assembly site. In both cases, it is possible to provide better conditions at the preassembly site for preassembling the module—the integrity of the module is either ensured per se or by attaching the above-explained frame for transportation.

In a further method step, the module is preferably initially provided next to the internal combustion engine and then attached to the internal combustion engine.

The frame can preferably be removed before the module is attached to the internal combustion engine, but, given a suitable design of the frame, the latter can also be used together with the module and can remain in the engine compartment. According to this development, the arrangement according to the concept of the invention preferably has a frame which is not fluid-conducting—i.e. exclusively serves for the support and transport function—on which at least one of the supercharging units is held.

In a further particularly preferred method step, the first arrangement of supercharging units for supercharging an internal combustion engine can be designed exclusively for charge air and arranged overall on a first side of the internal combustion engine.

In a further method step, a second arrangement of supercharging units can preferably be designed exclusively for supercharging an internal combustion engine with exhaust gas and can be arranged on a second, identical or different, side of the internal combustion engine. That is to say, for example, two individual modules—if appropriate with different functionality, for example one for charge air supply and the other for exhaust gas recirculation—can be supplied and attached, for example, to a first exhaust gas side of the engine and to a second charge air side of the engine.

Exemplary embodiments of the invention are now described below in comparison to the prior art, part of which is likewise illustrated, with reference to the drawing. The drawing is not necessarily intended to illustrate the exemplary embodiments to scale, but rather the drawing, where useful for explanation purposes, is executed in a schematized and/or slightly distorted form. With regard to additions to the teaching which can be seen directly from the drawing, reference is made to the relevant prior art. In this case, it should be taken into consideration that diverse modifications and changes with regard to the form and the detail of an embodiment can be undertaken without departing from the general concept of the invention. The features of the invention which are disclosed in the description, in the drawing and in the claims can be essential both individually and in any desired combination for the development of the invention. In addition, the scope of the invention includes all of the combinations of at least two of the features disclosed in the description, the drawing and/or the claims. The general concept of the invention is not restricted to the exact form or the detail of the preferred embodiment shown and described below or restricted to a subject matter which would be limited in comparison to the subject matter claimed in the claims. Where dimensional ranges are specified, values which fall within the specified limits should also be disclosed as limit values and to be usable and claimable in any desired manner.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
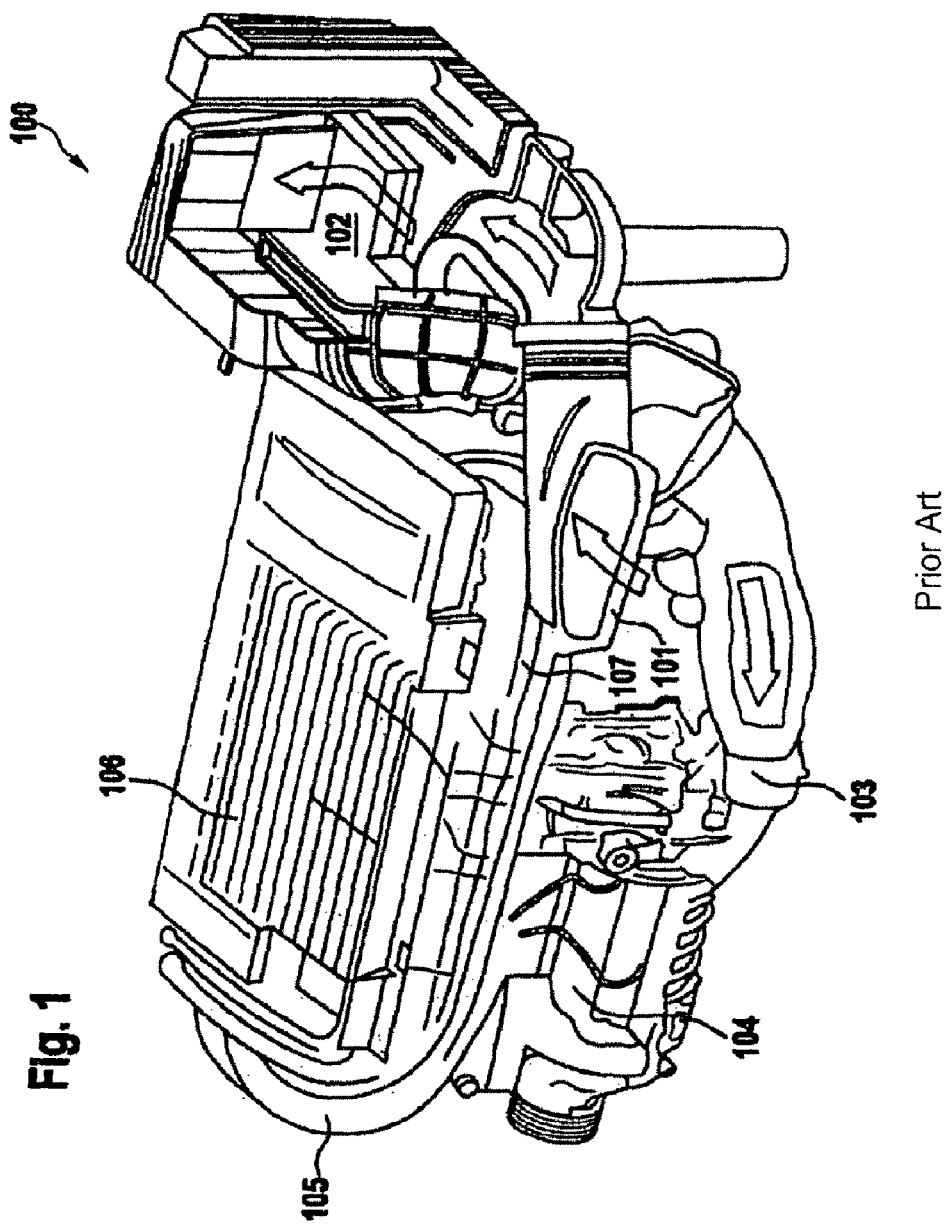
FIG. 1 shows a perspective view of a charge air supply system with scattered supercharging units, according to the prior art.

FIG. 1 shows a known arrangement for compressor supercharging 100 to clarify an individual example according to which the individual components and the associated connecting technology are distributed comparatively far from one another over the engine compartment in accordance with the specific construction space situation in the engine compartment. In the present case, the arrangement for compressor supercharging 100 comprises an air intake 101 via which the charge air, which is illustrated with arrows, is supplied via a first connecting path to an air filter 102 and is supplied from there via an entry connection 103 to a compressor 104. On the output side of the compressor 104, the compressed and thereby heated charge air is supplied via a further entry connection 105 to a charge air cooler 106 which is arranged directly above the internal combustion engine and from which the cooled charge air is supplied in compressed form to an entry connection 107 for distribution to the cylinders.

In order to produce such an arrangement for compressor supercharging 100, the individual components 101 to 107 have to be delivered individually to the assembly site where they are fastened successively to or around the engine and are connected to one another. The tightness of the connecting points should be checked after the assembly at the final assembly site.

Figure 2:
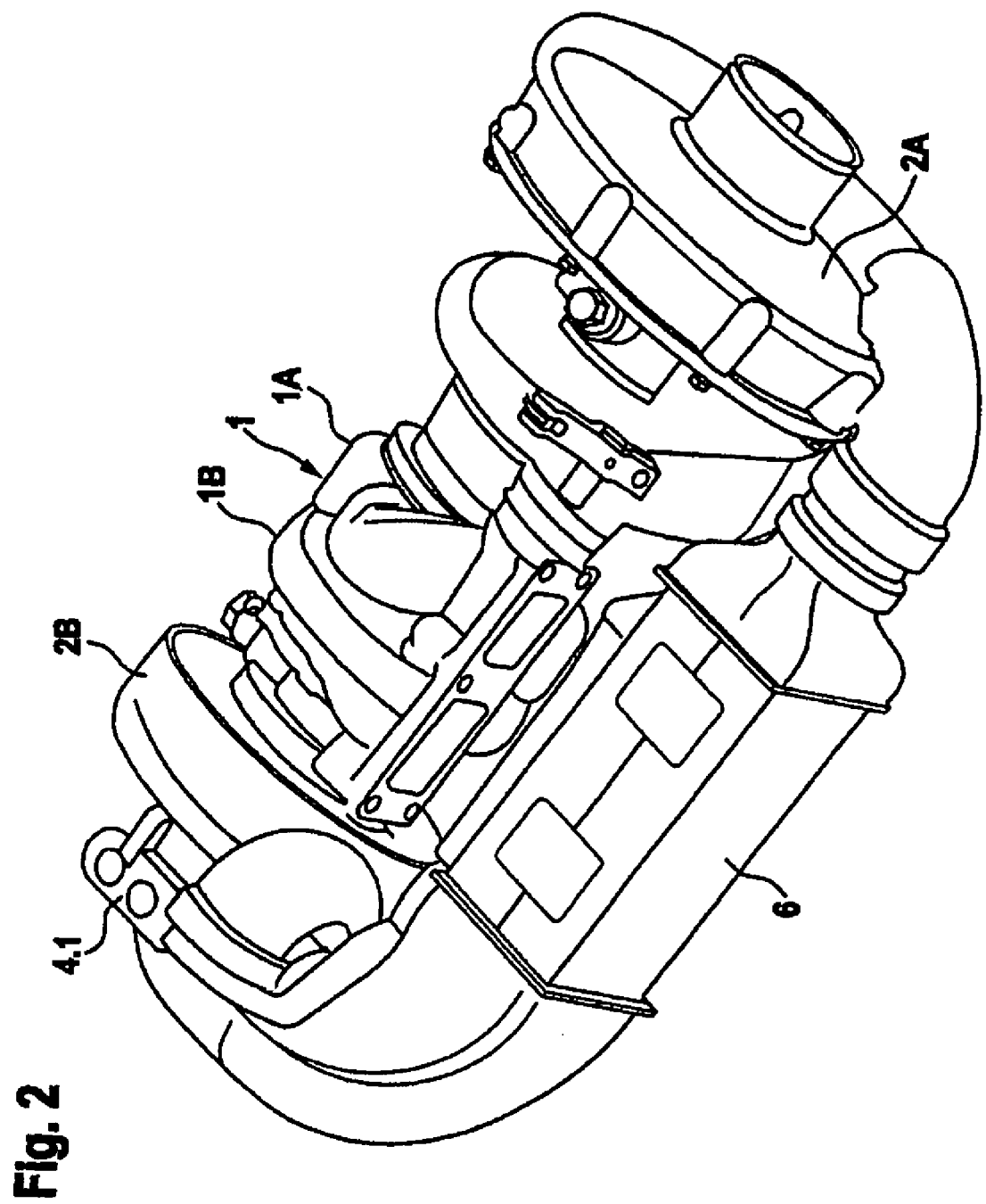
FIG. 2 shows a perspective view of an exhaust gas turbocharger with a charge air intermediate cooler for arranging in a module according to a first particularly preferred embodiment of the invention.
Figure 3A:
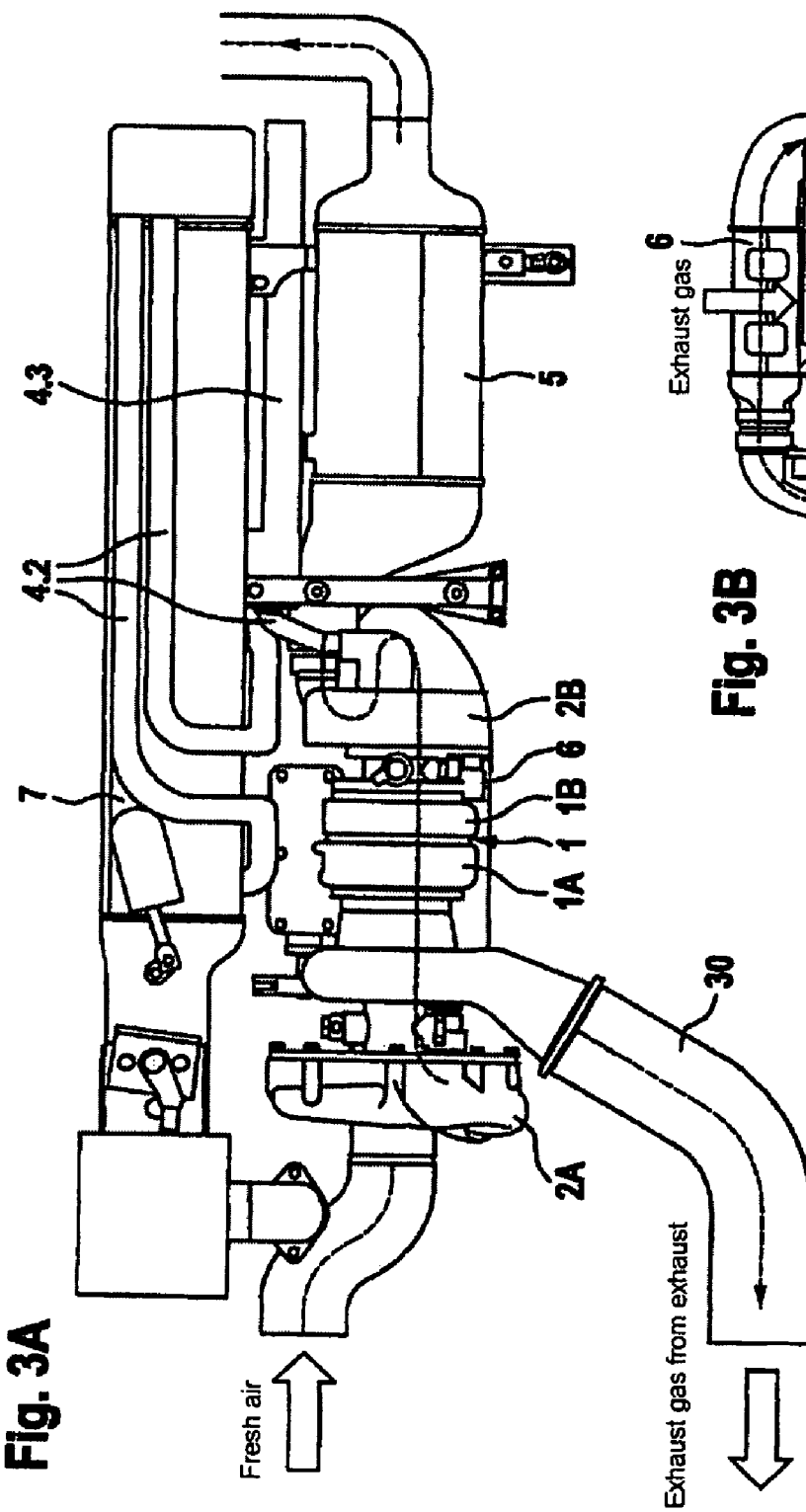
FIGS. 3A and 3B show the arrangement of FIG. 2 with a high-pressure charge air cooler and an exhaust gas cooler.
Figure 3B:
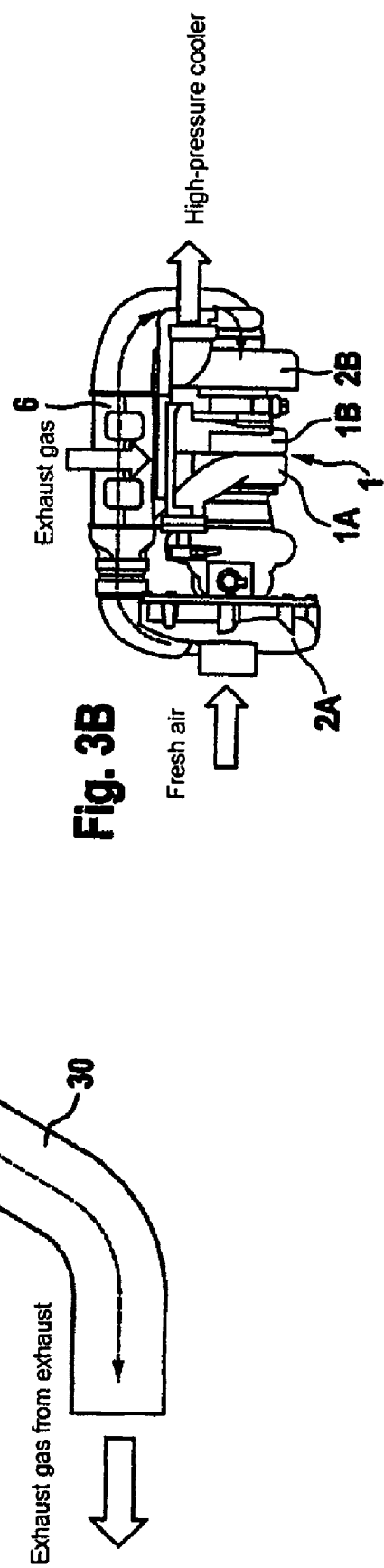
Figure 4:
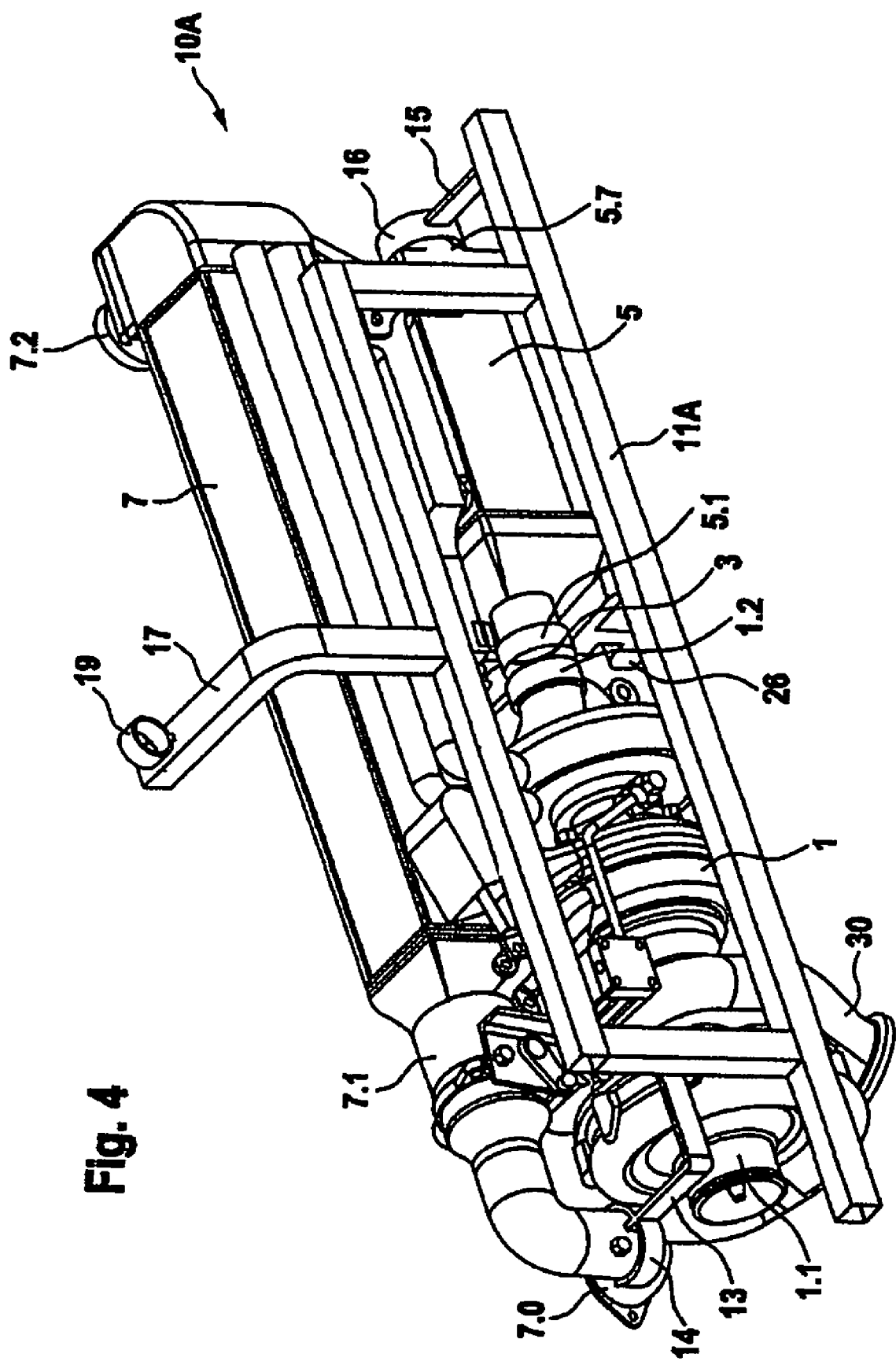
FIG. 4 shows a perspective view of an arrangement of supercharging units in a module with a holding structure according to the first particularly preferred embodiment of the invention.

FIG. 2 shows a constructional arrangement of an exhaust gas turbocharger 1 which is provided for arrangement in a module according to a first embodiment of the invention, as illustrated in FIG. 4. The exhaust gas turbocharger 1 has an axial turbine, denoted specifically in FIG. 3B, which is to be fed with exhaust gas and is formed as a low-pressure turbocharger 1A for driving a charge air low-pressure compressor 2A and as a high-pressure turbocharger 1B for driving a charge air high-pressure compressor 2B. The charge air high-pressure compressor is designed as a radial compressor. The constructional arrangement furthermore has a heat exchanger 6 which is provided for charge air cooling and is in the form of an intermediate cooler. The constructional arrangement of FIG. 2 is designed in the manner apparent in more detail from FIGS. 3A and 3B for taking in fresh air via the low-pressure compressor 2A, with the low-pressure compressor 2A being driven by the low-pressure turbocharger 1A. The fresh air which is compressed in this manner is guided via the intermediate cooler 6 and supplied in cooled form to the high-pressure compressor 2B which is driven via the high-pressure turbocharger 1B. The charge air which is compressed under high pressure in this manner is supplied in the manner apparent from FIG. 3A to a further heat exchanger 5, in the present case in the form of a high-pressure charge air cooler, in order to be supplied in cooled form as charge air to an internal combustion engine.

The constructional arrangement of FIG. 2 furthermore has a coolant connection 4.1 via which coolant can be supplied in the manner apparent from FIG. 3A in corresponding coolant lines 4.2 to, inter alia, a coolant plate 4.3 for cooling the heat exchangers 5, 6, 7.

Figure 5:
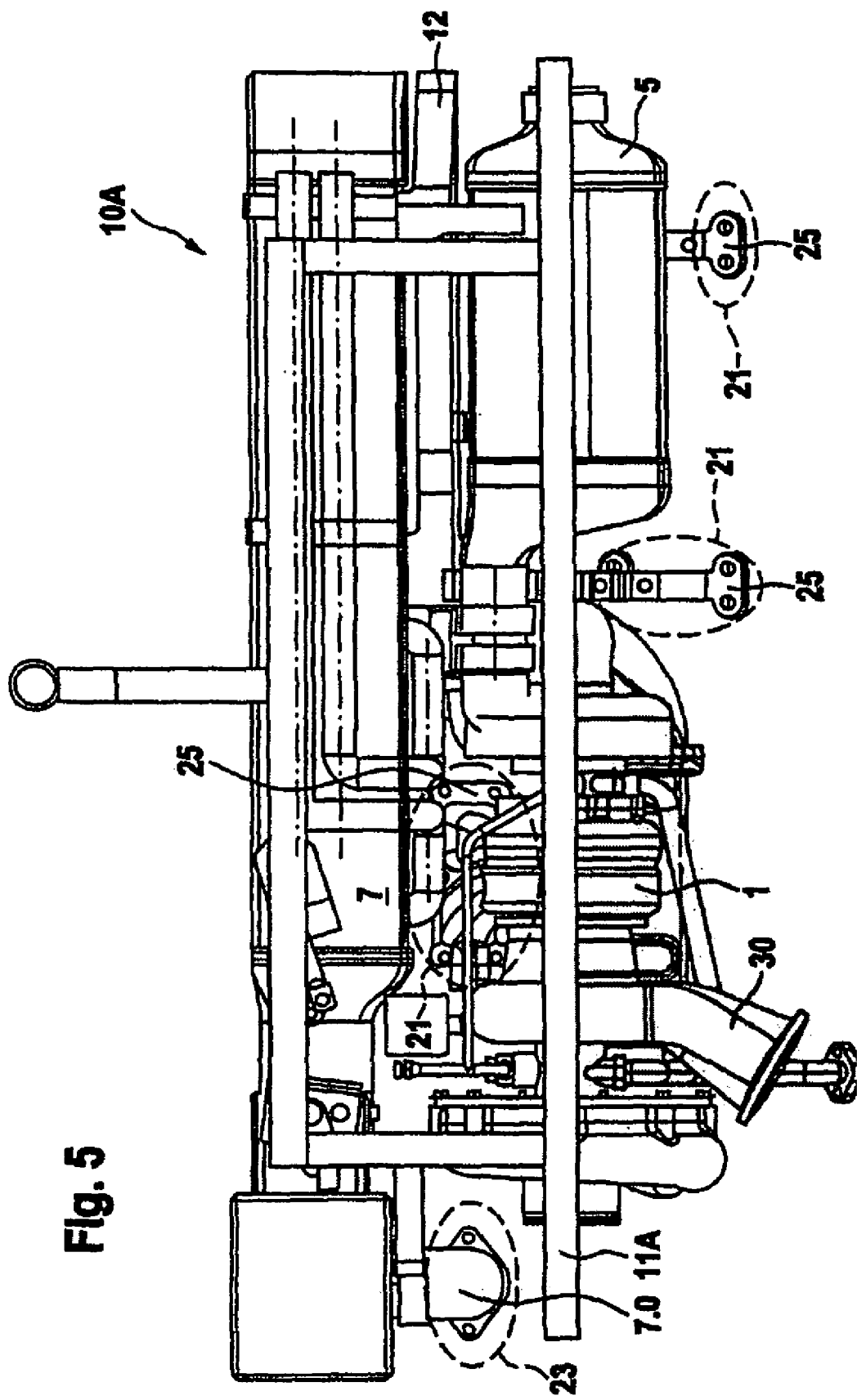
FIG. 5 shows an engine-side side view of the arrangement of FIG. 4.

FIG. 4 and FIG. 5 show a particularly preferred arrangement of the supercharging units which are described in FIG. 2, FIG. 3A, and FIG. 3B and are arranged combined in a module 10A with a holding structure. In the present case, the module 10A has a compressor 1 with an input connection piece 1.1 for charge air in the form of a high-pressure and low-pressure turbocharger which, in addition to being connected to the heat exchanger, is connected on the output side via an output connection piece 1.2, which is assigned to a connecting point 3, directly to an input connection piece 5.1 of a heat exchanger 5, in the present case in the form of a high-pressure charge air cooler. As a further supercharging unit which is not connected directly to the above-mentioned supercharging units, a further heat exchanger 7 in the form of an exhaust gas cooler is arranged in the module 10A together with the abovementioned supercharging units. The further heat exchanger 7 has a fluid-conducting, input-side input connection piece 7.1 and an output-side output connection piece 7.2 for exhaust gas.

In order to define the correct position of the supercharging units 1, 5, 7 with regard to their subsequent fitted position in the engine compartment, a frame 11A is integrated in the module 10A, the frame also ensuring the structural stability of the module 10A. For this purpose, the frame has a first strut 13 and a second strut 15 which respectively accommodate suitable parts of the supercharging units via a first annular receptacle 14 and a second annular receptacle 16. In the present case, the annular receptacle 14 accommodates a part of the input-side connection piece 7.1 of the further heat exchanger 7, which connection piece rests and is held at the other end on the first heat exchanger 5 by means of fastening arrangements 12 which can be seen better in FIG. 5. The first heat exchanger 5 in turn is accommodated with its output-side connection piece in the second annular receptacle 16 and is held on the frame 11A via the strut 15. In addition, the frame 11A has a transporting device 17 which, in the present case, is formed as a handle-like, L-shaped extension which is suitable both for grasping and for suspending and, on the end side, has an eyelet 19 to which, in turn, further fastening or transporting means, for example a cable, hook or the like, can be attached.

Figure 6:
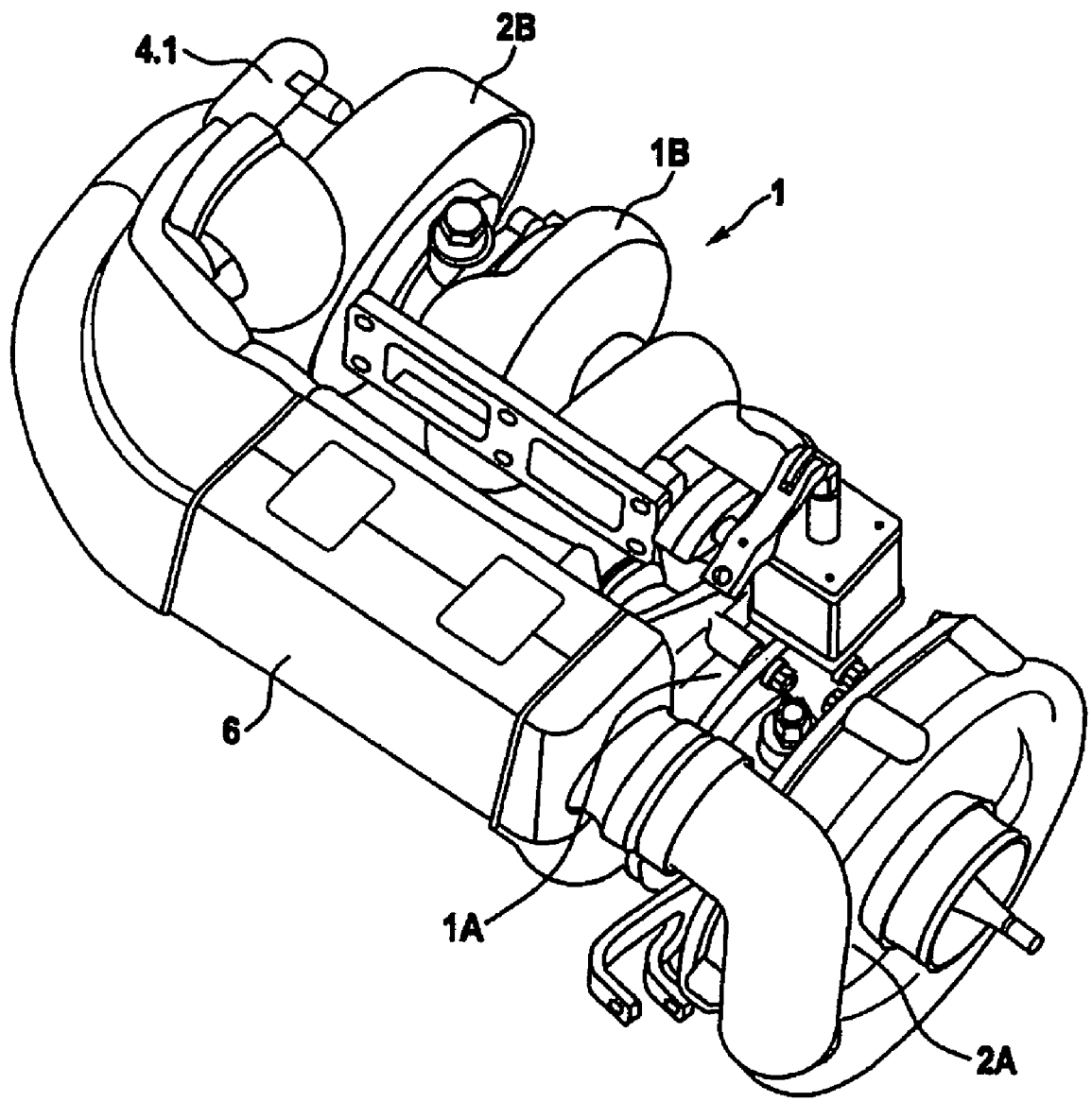
FIG. 6 shows a perspective view of a further exhaust gas turbocharger with a charge air intermediate cooler for arranging in a module according to a second particularly preferred embodiment of the invention.
Figure 7:
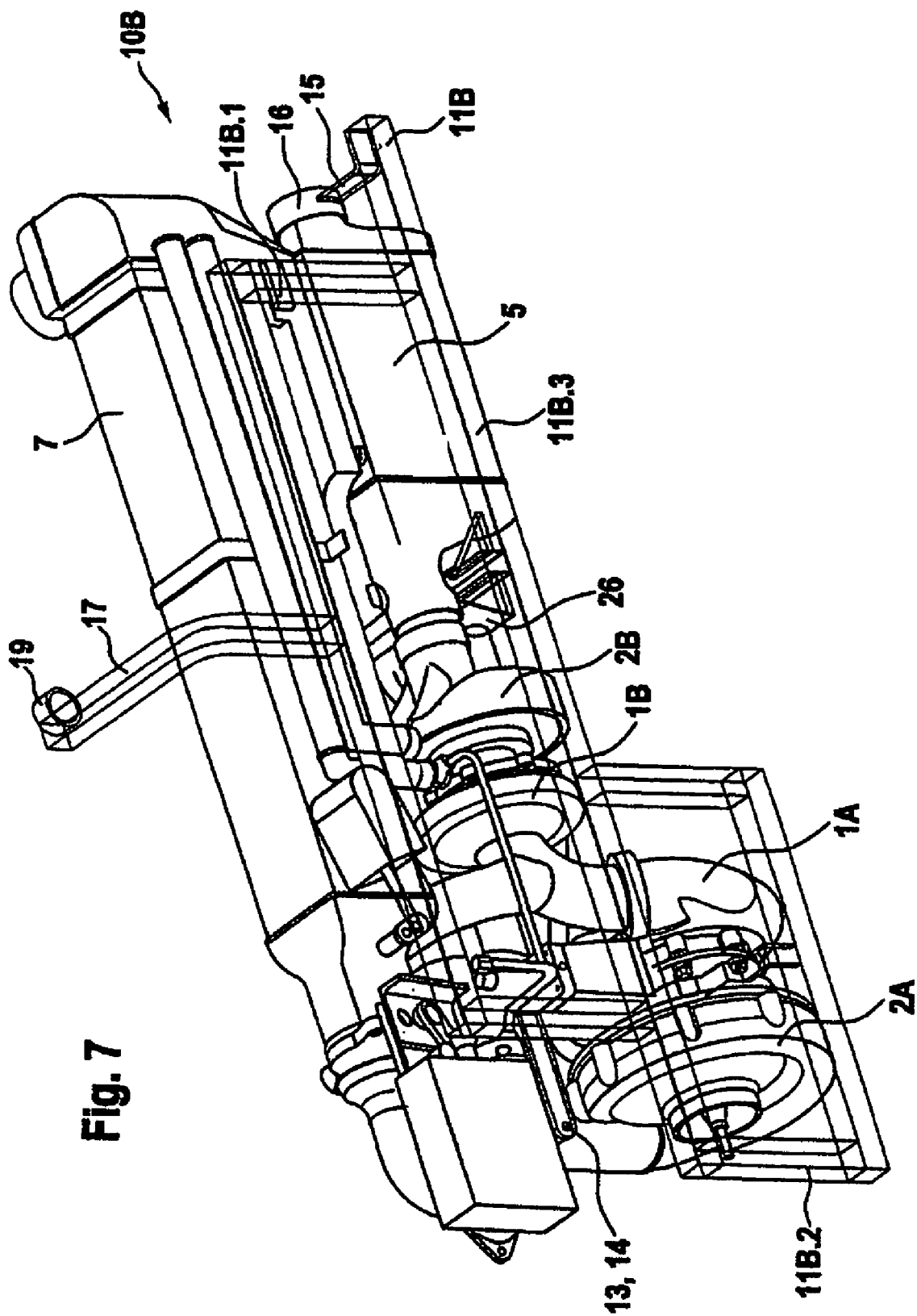
FIG. 7 shows a perspective view of an arrangement of supercharging units in a module with a further holding structure according to the second particularly preferred embodiment of the invention.
Figure 8:
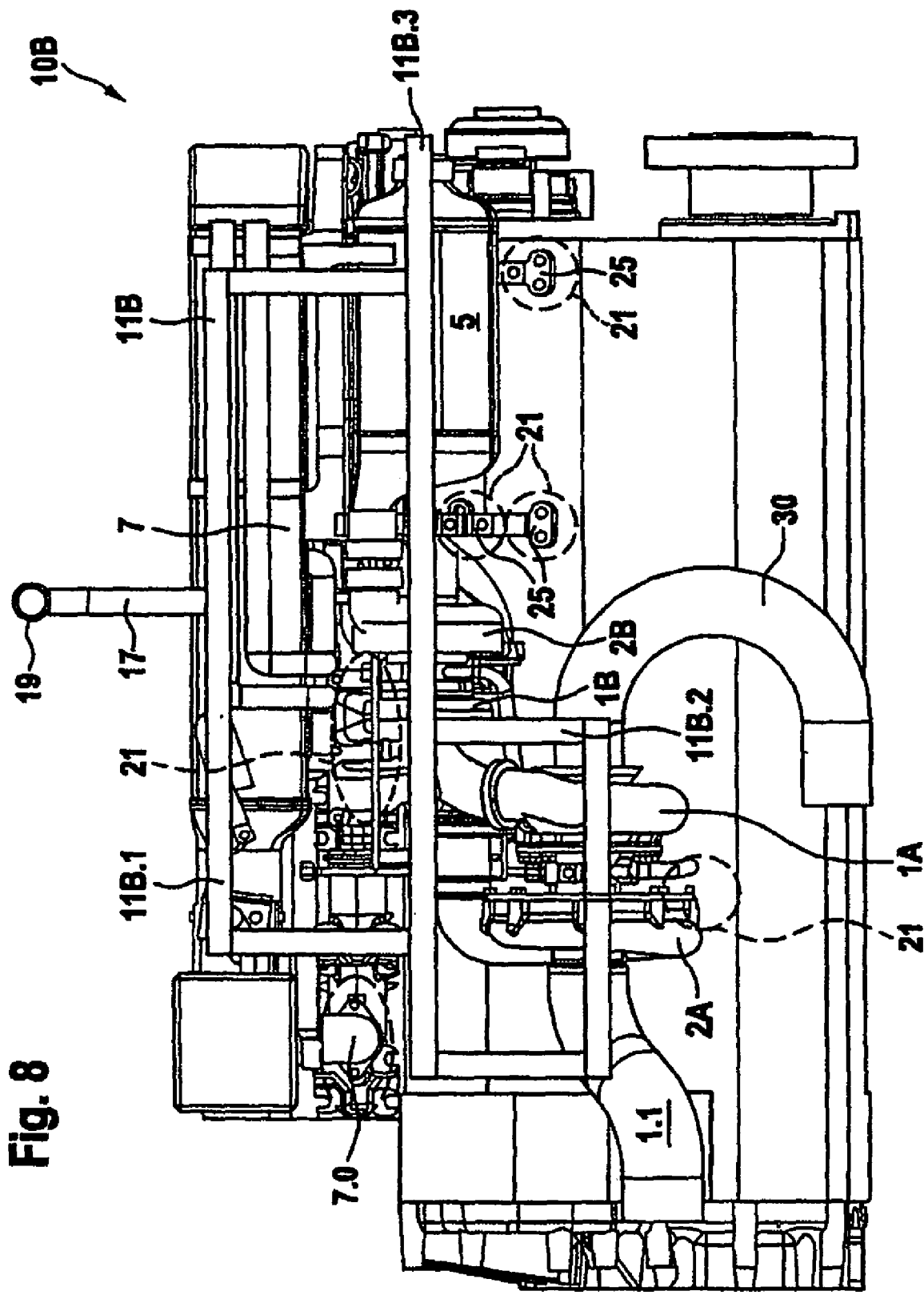
FIG. 8 shows an engine-side side view of the arrangement of FIG. 7.

FIG. 6 to FIG. 8 refer to a second particularly preferred embodiment of the invention.

For this purpose, FIG. 6 shows a constructional arrangement, which is modified in comparison to FIG. 2, of an exhaust gas turbocharger, in which, for the sake of simplicity, parts having an identical function are provided with the same reference numbers. In contrast to FIG. 2, according to which the charge air low-pressure compressor is formed as a radial compressor, in the present case the charge air low-pressure compressor is driven in modified form via the low-pressure turbocharger 1A in the manner further clarified in FIG. 7. The constructional arrangement shown in FIG. 6 is illustrated—similarly as in FIG. 4—in turn with a further heat exchanger 5 in the form of a high-pressure cooler and a further heat exchanger 7 in the form of an exhaust gas cooler, which are arranged together in a module 10B in the above-explained manner such that they are connected to each other in a fluid-conducting manner, with, at any rate, the compressor 1 and the heat exchanger 5 being held in the manner explained further below on a modified holding structure in the form of a frame 11B. Whereas the frame 11A of the module 10A explained in FIG. 2 to FIG. 5 surrounds a single rectangular compartment with a structural frame, the modified frame 11B provides two rectangular compartments which are respectively formed by a first rectangular structural frame 11B.1 and a second rectangular structural frame 11B.2, the structural frames 11B.1 and 11B.2 being together connected to a common longitudinal strut 11B.3 of the structural frame 11B. This design of the frame 11B in the modified form takes account of the modified form of driving the charge air low-pressure compressor 2A via the low-pressure turbocharger 1A that is explained with regard to FIG. 7 and durably integrates said form of driving in the module 10B. In the constructional unit, both modules 10A and 10B provide an exhaust gas output pipe 30 leading to the discharge means.

In a method for producing a charge air supply system and an exhaust gas recirculation system, the arrangement, which is described in the present case, of the supercharging units 1, 5, 6, 7 for supercharging an internal combustion engine (not illustrated specifically), for example in the form of a spark ignition engine or a diesel engine, with a fluid comprising charge air and exhaust gas can be provided in an advantageous manner, with the supercharging units 1, 5, 7 being combined in the described module 10A, 10B, and, via the connecting point 3, the compressor 1 being connected with its output-side connection piece 1.2 directly to an input-side connection piece 5.1 of the first heat exchanger in a fluid-conducting manner—i.e. in a fluid-conducting manner in the operating state and, in the form shown in the present case, in a manner suitable for fluid conduction. The arrangement of said supercharging units, which are therefore partially connected in a fluid-conducting manner or are fastened structurally, can be attached in the manner previously described to a frame 11A, 11B for transportation and for preassembly, the frame 11A, 11B now defining the arrangement of the supercharging units 1, 5, 7 so that they are fitted in an engine already in their fitted position. The transporting device 17 of the frame 11A, 11B can be used to transport the module 10A, 10B from a preassembly site to a final assembly site where the module 10A, 10B can be provided next to an internal combustion engine and can be directly attached to the latter.

For this purpose, the module provides suitably designed engine fastenings 21 and also suitable fluid-conducting connections 23 for an engine periphery. In the present case, one engine connection 23 is formed as a connection piece 7.0 which is on the engine exhaust gas output side and, downstream of the exhaust gas flow, as previously explained, guides a first annular receptacle 14 on the strut 13 of the frame 11A, 11B such that it reaches through to the input connection piece 7.1 of the second heat exchanger 7. In the present case, the fastening points 21 are formed as struts attached, for example, to a connecting point between supercharging units 1, 5, 7 or directly to a supercharging unit 1, 5, 7 and having end-side flanges 25 or holding struts 26 which have suitable openings, for example for receiving a screw connection or U-shaped limbs or the like.

The invention is based on an arrangement, which is to be attached in the construction space of a motor vehicle, of supercharging units for supercharging an internal combustion engine with a fluid comprising charge air and/or exhaust gas, wherein the supercharging units comprise at least one heat exchanger 5, 7 and at least one compressor 1. According to the concept of the invention, the supercharging units are arranged combined in a module 10A, 10B and, in order for the same to be combined in the module, the supercharging units are connected at any rate partially to one another in a fluid-conducting manner, and at least one of the supercharging units is held on a holding structure. This enables the supercharging units to be handled flexibly, simply and nevertheless so as to save on construction space and outlay on connection, in particular for the production of a charge air and/or exhaust gas recirculation system.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method comprising:
   providing a module comprising:
      an exhaust gas turbocharger comprising:
         a low-pressure charge air compressor located on an input side of the exhaust gas turbocharger,
         a high-pressure charge air compressor located on an output side of the exhaust gas turbocharger that opposes the input side of the exhaust gas turbocharger, and
         an intermediate charge air cooler,
         wherein the low-pressure charge air compressor is configured to intake a flow of charge air and provide the flow of charge air through the intermediate charge-air cooler to the high-pressure charge air compressor; and
      a high-pressure charge air cooler connected to the high-pressure charge air compressor and located adjacent to the high-pressure charge air compressor,
         wherein the low-pressure charge air compressor, intermediate charge air cooler, high-pressure charge air compressor, and high-pressure charge air cooler are linearly arranged from a first side of the module to a second, opposing side of the module;
   providing a holding structure comprising at least one rectangular structural frame; and
   attaching the rectangular structural frame to portions of the exhaust gas turbocharger, the high-pressure charge air cooler, or a combination thereof.

2. The method of claim 1, further comprising:
   transporting the module and the holding structure from a preassembly site to a final assembly site;
   arranging the module next to an internal combustion engine; and
   attaching the module to the internal combustion engine.

3. The method of claim 2, further comprising removing the holding structure from the module.

4. A method comprising
   providing a module comprising:
      an exhaust gas turbocharger comprising:
         a low-pressure charge air compressor located on an input side of the exhaust gas turbocharger,
         a high-pressure charge air compressor located on an output side of the exhaust gas turbocharger that opposes the input side of the exhaust gas turbocharger, and
         an intermediate charge air cooler,
         wherein the low-pressure charge air compressor is configured to intake a flow of charge air and provide the flow of charge air through the intermediate charge-air cooler to the high-pressure charge air compressor;
      a high-pressure charge air cooler connected to the high-pressure charge air compressor and located adjacent to the high-pressure charge air compressor; and
      an exhaust gas cooler located adjacent to both the exhaust gas turbocharger and the high-pressure charge air cooler;
   providing a holding structure comprising:
      at least one rectangular structural frame,
      a first strut extending from the at least one rectangular structural frame and having a first annular receptacle on an end thereof, and
      a second strut extending from the at least one rectangular structural frame and having a second annular receptacle on an end thereof;
   attaching the first annular receptacle to a connection piece located on one side of the exhaust gas cooler; and
   attaching the second strut to a connection piece located on one side of the high-pressure charge air cooler.

5. The method of claim 4, further comprising:
transporting the module and the holding structure from a preassembly site to a final assembly site;
arranging the module next to an internal combustion engine; and
attaching the module to the internal combustion engine.

6. The method of claim 5, further comprising removing the holding structure from the module.

7. A module comprising:
an exhaust gas turbocharger comprising:
a low-pressure charge air compressor located on an input side of the exhaust gas turbocharger,
a high-pressure charge air compressor located on an output side of the exhaust gas turbocharger that opposes the input side of the exhaust gas turbocharger, and
an intermediate charge air cooler,
wherein the low-pressure charge air compressor is configured to intake a flow of charge air and provide the flow of charge air through the intermediate charge-air cooler to the high-pressure charge air compressor; and
a high-pressure charge air cooler connected to the high-pressure charge air compressor and located adjacent to the high-pressure charge air compressor,
wherein the low-pressure charge air compressor, intermediate charge air cooler, high-pressure charge air compressor, and high-pressure charge air cooler are linearly arranged from a first side of the module to a second, opposing side of the module.

8. The module of claim 7, wherein the exhaust gas turbocharger further comprises a low-pressure turbocharger configured to drive the low-pressure charge air compressor, and a high-pressure turbocharger configured to drive the high-pressure charge air compressor.

9. The module of claim 7, wherein an output connection piece of the exhaust gas turbocharger is connected directly to an input connecting piece of the high-pressure charge air cooler.

10. The module of claim 7, further comprising an exhaust gas cooler located adjacent to both the exhaust gas turbocharger and the high-pressure charge air cooler.

11. The module of claim 7, further comprising a holding structure, the holding structure comprising at least one rectangular structural frame attached to portions of the exhaust gas turbocharger, the high-pressure charge air cooler, or a combination thereof.

12. The module of claim 7, wherein the exhaust gas turbocharger is an axial turbine or a radial turbine.

13. A module comprising:
an exhaust gas turbocharger comprising:
a low-pressure charge air compressor located on an input side of the exhaust gas turbocharger,
a high-pressure charge air compressor located on an output side of the exhaust gas turbocharger that opposes the input side of the exhaust gas turbocharger, and
an intermediate charge air cooler,
wherein the low-pressure charge air compressor is configured to intake a flow of charge air and provide the flow of charge air through the intermediate charge-air cooler to the high-pressure charge air compressor;
a high-pressure charge air cooler connected to the high-pressure charge air compressor and located adjacent to the high-pressure charge air compressor; and
an exhaust gas cooler located adjacent to both the exhaust gas turbocharger and the high-pressure charge air cooler.

14. The module of claim 13, further comprising at least one coolant line configured to provide a flow of coolant therethrough to a coolant plate that is configured to cool the intermediate charge air cooler, the high-pressure charge air cooler, and the exhaust gas cooler.

15. The module of claim 13, wherein the exhaust gas cooler is configured to allow a flow of exhaust gas therethrough in a direction parallel to a direction of the flow of charge air through the exhaust gas turbocharger and high-pressure charge air cooler.

16. The module of claim 13, further comprising a holding structure, the holding structure comprising:
at least one rectangular structural frame;
a first strut extending from the at least one rectangular structural frame and having a first annular receptacle on an end thereof and
a second strut extending from the at least one rectangular structural frame and having a second annular receptacle on an end thereof,
wherein the first annular receptacle is configured to accommodate a connection piece located on one side of the exhaust gas cooler, and
wherein the second strut is configured to accommodate a connection piece located on one side of the high-pressure charge air cooler.

17. The module of claim 16, wherein the holding structure further comprises a transporting device.

18. The module of claim 17, wherein the supporting device comprises an L-shaped extension having an eyelet on an end of the L-shaped extension.

* * * * *